United States Patent

[11] 3,614,551

[72] Inventors Robert Jenkins
Cupertino;
Carver A. Mead, Pasadena; James
McCaldin, South Pasadena, all of Calif.
[21] Appl. No. 824,898
[22] Filed Apr. 25, 1969
[45] Patented Oct. 19, 1971
[73] Assignee Monsanto Company
St. Louis, Mo.

[54] OHMIC CONTACT TO ZINC SULFIDE DEVICES
9 Claims, No Drawings

[52] U.S. Cl. 317/234, 317/234 L, 317/234 M, 317/234 N, 317/235 N, 317/235 AC
[51] Int. Cl. H01l 9/00, H01l 15/00
[50] Field of Search 317/234 (5.2), 234 (5.3), 234 (5.4), 235 (27), 234 L, 234 M, 234 N, 235 N, 235 AC

[56] References Cited
UNITED STATES PATENTS

| | | | |
|---|---|---|---|
| 3,518,511 | 6/1970 | Kollmans | 317/237 |
| 3,515,954 | 6/1970 | Maruyama | 317/234 |

*Primary Examiner*—John W. Huckert
*Assistant Examiner*—Martin H. Edlow
*Attorneys*—Samuel Lindenberg and Arthur Freilich

ABSTRACT: A zinc sulfide body is treated to form an ohmic contact by applying a Group II metal or alloy thereof to a surface region of the body in the presence of a source of donor precursor such as a Group IIIb metal or a halogen and heating the region to a temperature above the melting temperature of the metal or alloy.

OHMIC CONTACT TO ZINC SULFIDE DEVICES

BACKGROUND OF THE INVENTION

1. Field of the Invention

The present invention relates to electroding zinc sulfide, and more particularly, the present invention relates to processing zinc sulfide devices to form electron-injecting contact regions exhibiting ohmic characteristics at room temperature.

2. Description of the Prior Art

Currently available gaseous light emitting devices operate at relatively high voltages and therefore are incompatible with conventional integrated circuits. This increases the cost of construction and operation of electronic instruments utilizing these devices. A substantial effort in the progress to develop solid state, electroluminescent devices that emit light at wavelengths at which the eye is most efficient and which are compatible with standard transistor or integrated circuit voltages.

Light emission in solid-state electroluminescent devices occurs by radiative recombination of injected electrons and holes which combine a recombination centers in a manner favoring the emission of a photon. The maximum available energy of the photon is limited by the band-gap of material utilized to fabricate the device. The currently available low-power devices that have reasonable levels of light emission at room temperature have been fabricated from materials having a narrow band-gap of the order of about 2.5 electron volts or less, and emit radiation in the red region at wavelengths longer than 6,500 Angstroms. The eye is 30 times less efficient in the red region of the spectrum than in the green.

Devices capable of emitting light at a variety of wavelengths would permit communication of an enormous quantity of information by the color variation in a multicolor display.

Zinc sulfide (ZnS) is known to be a very efficient phosphor and has a wide band-gap of 3.6 electron volts. It would appear that light at the desired shorter wavelengths from the recombination of electrons and holes injected into a body of zinc sulfide.

Although it is possible to prepare crystals of ZnS with relatively high N-type conductivity, one of the major problems in the development of zinc sulfide electroluminescent devices has been the difficulty in forming ohmic contact regions without simultaneously introducing large concentrations of defects which interfere with desired injection. Another major problem in electroding zinc sulfide stems mainly from its very low electron affinity and the very large energy barrier exists between the zinc sulfide surface and metal contact interface.

The barrier energy behavior of a covalent semiconductor metal interface such as silicon, or germanium differs considerably compared with the more ionic wide band-gap semiconductors such as zinc sulfide. With the covalent semiconductors, the barrier energy does not depend very strongly on the metal which is in contact with the semiconductor surface and is largely a property of the semiconductor surface. In contrast the barrier energy between a more ionic semiconductor and a metal is a function of both the electronegativity of the metal and the semiconductor.

With a few semiconductors, an ohmic contact can be made by decreasing the barrier energy of the metal-semiconductor junction such that the thermal current which flows in the reverse direction is large enough for the particular device application. However with zinc sulfide, metals with an electronegativity small enough to reduce the barrier energy sufficiently for device purposes do not exist. Metals that can be effectively electroded to zinc sulfide exhibit a barrier energy of about 1 to 2 electron volts from the conduction band edge.

Thermal current however, is not the only current which can flow in a metal-semiconductor system. It is known that as the net ionized impurity concentration in the semiconductor depletion region beneath the metal contact is increased, the width of the depletion layer is decreased. At very high carrier concentrations, the depletion layer becomes sufficiently thin that quantum mechanical tunneling can take place. This tunneling results from the fact that the electron probability distribution in the forbidden region decreased exponentially with distance and hence an electron can penetrate a barrier if it is sufficiently thin.

A tunneling contact requires net ionized impurity density in the region of the semiconductor body under the metal contact preferably above about $10^{18-19}$carrier cm$^{13}$. It is very difficult to introduce such a high density of atoms into a wide band-gap material such as zinc sulfide without concomitantly introducing compensating defects with negate the effect of the desired impurities. If a donor precursor such as indium is placed on clean, cleaved surface of N-type conducting zinc sulfide crystal and the surface is heated until the indium melts and is then cooled, the indium wets and otherwise reacts with the surface. However, the current voltage characteristics of the contact indicates that the indium has not been introduced into this surface and the electrode present essentially the same barrier as before the processing. The contact will rectify and cannot be used to supply electrons to the N-type crystal, the polarity necessary for an ohmic contact.

The most satisfactory prior art technique for forming contacts has been reported by Aven and Mead in Volume 7, No. 1 of Applied Physics Letters. This technique relies on the combination of very powerful chemical gettering agents and a chemically etched zinc sulfide surface. Contacts with the best overall performance are obtained according to this technique by etching the zinc sulfide crystal in pyrophosphoric acid at 250° C. and immediately scribing the indium contacts onto the phosphate phase with a liquid indium-mercury amalgam and firing at 350° C. on a hydrogen atmosphere. It is believed that the zinc atoms are extracted and held in the phosphate phase and the much larger amount of indium passes through this phase and enters the lattice in numbers sufficient to form a net ionized donor density of at least $10^{18}$cm$^{13}$.

However, even under these corrosive conditions, the final contact is not always ohmic at room temperature. Furthermore, the technique will not work on a cleaved or mechanically prepared surface and the known photoresists are not capable of protecting the edges and back of the body of zinc sulfide during the treatment with pyrophosphoric acid.

OBJECTS AND SUMMARY OF THE INVENTION

It is therefore an object of the invention to provide an ohmic contact on the body of conducting N-type zinc sulfide.

A further object of the invention is to provide a technique for electroding zinc sulfide under a wider variety of conditions which are compatible with available photoresist processing. Yet another object of the invention is the provision of an electron-injecting contact on zinc sulfide surfaces than can be provided on unprepared, or mechanically prepared surfaces that can be effected in inert, reducing or oxidizing atmospheres; or vacuum.

These and other objects and many attendant advantages of the invention will become apparent as the description proceeds.

Zinc sulfide is treated to form an ohmic electrode according to the invention by applying to a surface region of a body of N-type zinc sulfide in the presence of a source of a donor precursor, a Group IIb metal or alloy containing Group IIb metal, and heating said region to above the melting temperature of the metal or alloy. The donor precursor is preferably a Group III metal such as aluminum, gallium or indium or halogen such as Cl Br, I, and must be present in the surface region in the density of at least $10^{17}$ cm.$^{13}$ before treatment or may be substitutionally introduced into the surface region during the treatment by being present on the surface alloyed with the Group IIb metal.

Best results have been achieved by referring to the temperature-composition phase diagram for the particular Group IIb and Group III elements considered and selecting an alloy on the Group IIb rich side of the eutectic composition. The final contacts have been found to exhibit a resistivity at room temperature of less than 25 ohm–cm$^2$ and in preferred embodiments of less than 1 ohm–cm$^2$. Lower resistivity contacts have been formed with cadmium as compared to zinc.

The final device is in the form of a body of N-type zinc sulfide provided with an ohmic electrode. The electrode comprises a Group IIb metal or Group III metal alloy thereof in a firm and stable metalurgical contact with the thin surface region of the body which has a net donor density of greater than $10^{17}$ cm$^{13}$. It is to be understood that zinc sulfide devices according to the invention are intended to include electroded bodies containing a mixture of zinc sulfide and other wide band-gap materials such as cadmium sulfide.

In one procedure, according to the invention the Group IIb metal or Group III alloy thereof is brought into intimate contact with the surface region of a zinc sulfide body. This may be accomplished by evaporating the metal on the surface of the region or by pressing a preform of the metal on the surface. The condition of the surface is not critical and it may be sawed, abraded, cleaved or chemically etched. The treatment is facilitated by initially wetting the surface with a liquid metal such as a mercury-indium amalgam or gallium.

The region in intimate contact with the metal is then heated to above the melting temperature of the metal, suitably for a short period which can be as short as a few seconds. The temperature is sufficiently high to enable zinc atoms to become disrupted from the lattice of the crystal. The temperature typically ranges from about 350° C. to 450° C.

The processing can be carried out in an inert atmosphere such as argon, in vacuum or even in an oxidizing atmosphere such as sulphur vapor. The processing chemicals utilized in the pretreatment of the surface are compatible with available photo resists which may be present to protect the nontreated surfaces of the crystal body.

Though the manner in which the contact is formed and operates has not been definitely determined, it is believed that the Group IIb metal and especially cadmium is introduced into the surface region. Cadmium sulfide tends to become metal rich when heated while zinc sulfide tends to become metal poor when heated. During the brief period of heating the surface region, cadmium atoms enter the crystal and occupy the metal vacancies which are present compensating the donor atoms. Thus, a thin layer of very high net impurity density is produced just under the contact which allows the aforementioned electron tunneling to take place. Thus an effective ohmic contact results.

The following examples are offered only by way of illustration, it being understood that many substitutions, alterations and modifications can readily be made without departing from the scope of the invention.

DESCRIPTION OF THE PREFERRED EMBODIMENTS

EXAMPLE I

A slice of low-resistivity N-type zinc sulfide crystal was mechanically cleaved from a zinc sulfide material doped with $10^{19}$ aluminum donor atoms per cm$^3$. The net donor density of this crystal was about $10^{17}$ donor atoms per cubic centimeter. A surface region of the slice was chemically etched in HC1 at 50° C. for 5 minutes.

The etched surface was then scrubbed with an indium-mercury amalgam to wet the surface. A performed slug of slightly cadmium-rich indium-cadmium alloy was pressed onto the surface and the slice was heated on a platinum strip heater for 1 minute at 350°–450° C. The heating was conducted in an argon atmosphere. The slice was cooled to room temperature. The contact resistance of the electrode was measured and was found to exhibit a resistance of about 1 ohm–cm$^2$. The slug was in a form metallurgical contact with the surface.

The procedure was successfully repeated in a cleaved zinc sulfide surface and on an abraded surface. When the procedure was repeated with a 90 percent cadmium 10 percent indium alloy slug, the resistance of the contact was only slightly higher.

EXAMPLE II

The procedure of example I was repeated by substituting a cadmium-gallium alloy having a weight ratio of 13:1:Cd:Ga, somewhat on the Cd rich side of the Cd–Ga eutectic preform and an electrode having a contact resistance of about 20 ohm–cm.$^2$ resulted.

EXAMPLE III

The procedure of example I was repeated utilizing a slightly zinc-rich slug of zinc-indium alloy, and an electrode having a contact resistance of about 100 ohm–cm.$^2$ was formed.

EXAMPLE IV

A slice of N-type zinc sulfide was mechanically cleaved from a zinc sulfide material doped with aluminum to a level of about $10^{19}$ atoms cm$^{13}$. The net donor density was about $10^{17}$ cm.$^{13}$ indicating that a large percentage of the aluminum atoms were not in a doner state but were complexed with Zn vacancies.

A preformed slug of cadmium was pressed onto the surface of the slice wetted with Cd–Hg amalgam and the slice was heated on a platinum strip heater for about 5 seconds at 350° to 450° C. in an argon atmosphere. The slice was cooled to room temperature and the contact resistance of the electrode was measured and was found to exhibit a resistance of about 10 ohm–cm $^2$. It is evident that a substantial percentage of the aluminum atoms in the thin surface region under the cadmium slug have been converted to donor atoms to form a net ionized donor density in the thin region of at least $10^{18}$ cm$^{13}$.

It is to be realized that only preferred embodiments of the invention have been disclosed and that numerous substitutions, alterations and modifications are permissible without departing from the scope of the invention as defined in the following claims.

What is claimed is:

1. A zinc sulfide device comprising:
a body of N-type sulfide;
a surface region of said body having a net donor density of at least $10^{18}$ cm$^{13}$; and
an ohmic electrode provided on said region and in contact with said region said electrode consisting essentially of a member selected from the class consisting of:
a. A Group IIb metal; and
b. alloys of a Group IIb metal and a Group IIIb metal.

2. A devise according to claim 1 in which said Group IIb metal is selected from cadmium or zinc.

3. A device according to claim 2 in which said Group IIB metal is cadmium.

4. A device according to claim 1 in which said net donor density is at least $10^{19}$ cm$^1$3.

5. A device according to claim 1 in which said electrode consists essentially of a Group IIb rich eutectic alloy of said Group IIb metal and a Group III metal.

6. A device according to claim 5 in which said Group IIIb metal is selected from indium, aluminum and gallium.

7. A device according to claim 6 in which said alloy comprises cadmium and indium.

8. A device according to claim 1 in which the resistance of said contact is less than 25 ohm–cm$^2$.

9. A device according to claim 7 in which the resistivity is less than 1 ohm–cm$^2$.

UNITED STATES PATENT OFFICE
CERTIFICATE OF CORRECTION

Patent No. 3,614,551 Dated October 19, 1971

Inventor(s) Robert Jenkins, et. al.

It is certified that error appears in the above-identified patent and that said Letters Patent are hereby corrected as shown below:

Column 4, line 36, "$10^{18}$ cm13" should read -- $10^{18}$ $cm^{-3}$ -- ; line 44, after "N-type", insert -- zinc -- ; line 46, "$10^{18}$ cm13" should read -- $10^{18}$ $cm^{-3}$ -- ; line 57, "$10^{19}$ cm13" should read -- $10^{19}$ $cm^{-3}$ -- .

Signed and sealed this 19th day of December 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334.